April 29, 1941.    R. EKSERGIAN ET AL    2,240,366
BRAKE
Filed Aug. 19, 1937
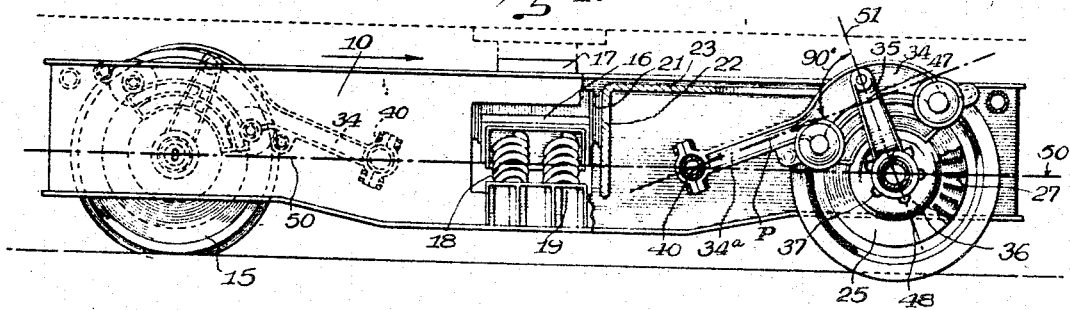
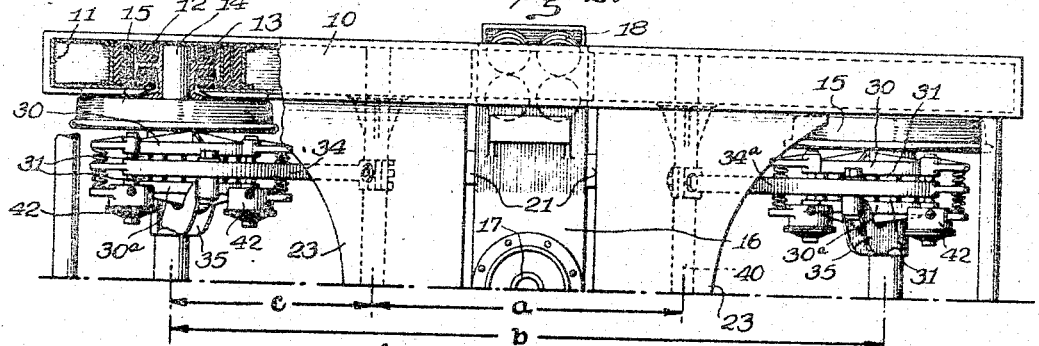
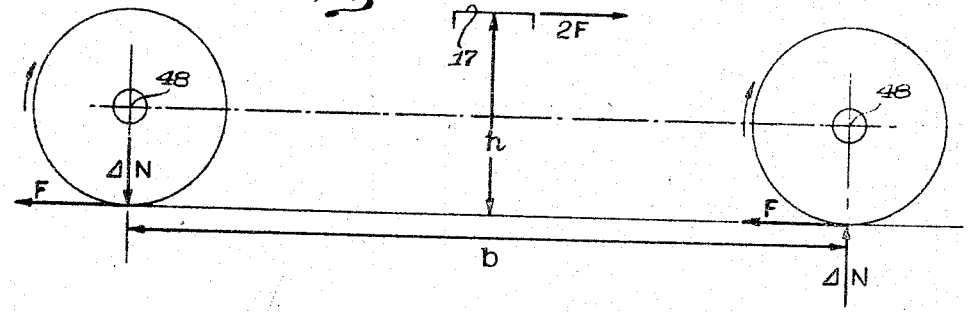
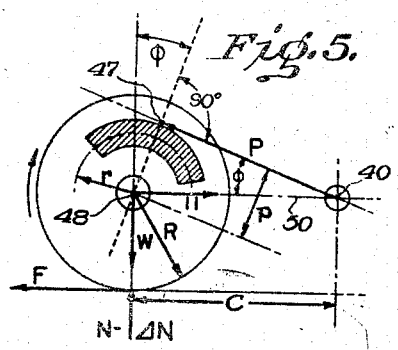
INVENTORS
Rupen Eksergian and
Carolus L. Eksergian
BY John P. Barbox
ATTORNEY Patented Apr. 29, 1941

2,240,366

UNITED STATES PATENT OFFICE 2,240,366

BRAKE

Rupen Eksergian, Lansdowne, Pa., and Carolus L. Eksergian, Detroit, Mich., assignors to Budd Wheel Company, Philadelphia, Pa., a corporation of Pennsylvania Application August 19, 1937, Serial No. 159,862

6 Claims. (Cl. 188—59)

This invention relates to improvements in brakes and more particularly to brakes for railway purposes.

The principal object of this invention is to provide improved railway brakes preferably of the non-tread applied type which are so associated with the wheels and the side frames of the truck that the braking torque will bring about no appreciable differential in the vertical loading on the truck spring suspension and axles at the opposite ends of the truck, when the brakes are applied.

Further objects and advantages of the invention will appear from the following disclosure of a preferred form of embodiment thereof taken in connection with the attached drawing in which, Fig. 1 is a side elevation of a truck with parts broken away to show the position of the brake;

Fig. 2 is a plan view of half of the truck shown in Fig. 1 with parts broken away;

Fig. 3 is a vertical transverse section through the brake and associated parts; and Figs. 4 and 5 are diagrammatic views of the operating forces on the truck and brake.

In accordance with one preferred form of embodiment of our invention, we provide a brake for a rail car truck which includes a plurality of brake members inwardly mounted from the wheels but connected thereto for the transmission of torque. While such brake members may be of cone or disc type, a disc type is preferred, and in this construction the disc is directly connected to the wheels, and the brake shoes are carried by a hanger as hereinafter described.

The railway truck 10, as generally shown in Figs. 1 and 2, has a suitable side frame which may consist of a hollow box section beam 11 with any form of resilient support 12 for the journal 13 in which the axle 14 is carried. The side frame is shown supported from the axle through rubber panel springs, as clearly shown in Figure 2, in which the rubber acts in shear, but it will be understood that any other known type of springing could be employed between the frame and axle. The journal 13 is shown to be of the outboard type, the details of which are not important but in this form of embodiment, the axle 14 carries the wheels 15 and with a fixed axle and the wheels 15 will rotate upon the axle, whereas if the axle is of the rotatable type the wheels 15 will be secured to it and the axle will rotate in the journal 13.

The truck may also include a floating or swing type bolster, generally indicated at 16, having a center plate 17, the bolster being supported by springs 18 from the spring platform 19 of the side frame, as shown in Fig. 1. The springs 18 are at an outward inclination tending to resist lateral movement of the bolster. The longitudinal movement of the bolster is resisted by pads 21 adjacent the webs 22, parts of the transoms. Each web 22 is a continuation of a horizontal web 23 and the webs together serve as a transom member maintaining the rigidity of the truck. It is to be understood, however, that the improved brake structure hereinafter described may be applied to any suitable truck and this particular truck is merely illustrative of one structure on which the brake may be placed. It will be understood that the body is supported from the truck through the center plate 17 and a usual king pin associated therewith, and since this support is well above the truck axles, it will be evident that, when the brakes are applied, the momentum of the car body acting at the center plate level and the adhesion at the rails together produce a couple tending to rotate the truck frame about a transverse axis which tilts the front of the truck frame down and raises the rear end, thus subjecting the front and rear springs and axles to unequal loading. Where soft springs are utilized between the truck frame and axles, such as are desirable to secure the easiest riding qualities under ordinary operation, this tilting or "pitching" of the truck frame is very severe, and causes not only extreme inequality in the loading of the front and rear springs and axles but also produces a very unpleasant longitudinal vibration of the car body with resultant discomfort to the passengers. It is this unequal loading with its attendant disadvantages that the invention is designed to avoid by a novel application of the braking forces to the truck frame.

A brake disc, generally indicated at 25, is suitably provided adjacent each wheel and secured thereto through a flange 36 which may be bolted at 37 to the wheel. Each disc preferably includes two braking surfaces or rings 26 and 26a and an intermediate series of webs 27 which are radial and of substantially uniform width extending from a point inward of the brake rings 26 and 26a to their outer extremity. These webs serve to establish a centrifugal action of air for cooling the interior of the brake rings and through conduction, their exterior braking surfaces. The flange 36 of pressed metal has its periphery cast into one ring 26 or 26a.

Cooperating with the brake rings 26 and 26a are the brake shoes 30 and 30a each of which have one or more brake blocks 31 of a suitable composite material which are adapted to be forced into braking relation with the brake discs. The brake shoes are supported preferably by a brake shoe anchor 34 and as hereinafter described, the torques of the respective blocks are converted into a resultant drag force directed by the brake shoe anchor extension 34a into the truck frame through its connection 40 therewith, 40 being an anchor shaft or rod forming a transverse connection between the side frames of the truck.

Shoes 30 are of about 120° angular extent. Their center of resultant tangential drag P lies near their outer peripheral edge, say at 47. They are weight supported on radial hanger arms 35 passing in the radial plane of symmetry 49 in which plane center 47 lies. Arms 35 are oscillably mounted on axles 48, and pivotally connected to anchors 34. Thus they are at right angles to the tangential resultant drag P. Anchors 34 and their extensions 34a extend in the direction of resultant P, and shaft 40 is located on the line of P. Shaft 40 is also in the horizontal plane of axle 48.

The means of actuation of the brake shoes against the brake disc is not claimed herein but it is preferably by pneumatic pressure. As shown the brake cylinder 42 is cast integral with the brake shoe 30a and is provided with a piston 43 having a piston rod 44 connecting with the opposite shoe 30 and passing through anchor 34 to support the shoes therefrom. The shoes are conveniently separated after braking by oppositely acting release springs 46 and 47 reacting with opposite sides of anchor 34.

This entire brake structure is all shown and described in a copending application of Carolus L. Eksergian, Serial No. 159,844, filed of even date herewith, Patent No. 2,214,762, September 17, 1940.

In view of the high braking torque that is required on rail car rolling stock, and in view of the comparatively heavy loads which frequently tax the capacity of the supporting springs, it is especially desirable that no changes in spring loading due to the brake actuation be brought about in the spring system. As the forward motion of the truck is decelerated, the car body, due to its inertia, exerts a force on center plate 17 of the bolster. This force exerts a turning moment on the truck and tends to cause the rear wheels to rise while increasing the pressure with which the forward wheels bear upon the track. Obviously the weight transfer at the rail cannot be affected by change of brake hanging. On the other hand, by anchoring the brakes to the truck frame in a predetermined manner, however, it has been found that changes in journal loading between front and rear can be counteracted, thus preventing tilting of the truck frame. This is done by disposing the brake arms 34a in such a position that the front and rear springs of the truck are maintained at their equilibrium value so far as vertical motion is concerned. No consideration need be given to variation of forces applied to the axle in a horizontal direction since they do not effect the spring loading due to the fact that they have no vertical reaction.

When the brakes are actuated two external forces, in addition to the weight of the car body, are applied on the truck frame, one force being the inertia of the car body and the other force being the resistance of the tracks to forward motion of the wheels.

The equations of equilibrium for any body are:

(1) $\Sigma M=0$
(2) $\Sigma F_V=0$
(3) $\Sigma F_H=0$ or, in other words, the sum of the moments (M) exerted by the external forces, the sum of the vertical forces, and the sum of the horizontal forces must each be zero. As pointed out above, Equation 3 does not enter into the problem of the present invention.

Referring to Fig. 4, F represents the tangential component force exerted by the track upon each wheel of the vehicle. The total force of inertia exerted by the car body upon the truck will then be 4F if the brakes are applied to all four wheels or 2F if the brakes are applied to one front and one rear wheel of the truck as shown. When the brakes are applied to the wheels, the following relationship must be established in order to fulfill the conditions of Equation 1:

(4) $\Delta N b - 2 F h = 0$ where $\Delta N$ equals the change in vertical reaction of the individual wheel due to braking, $b$ equals the distance between axles, and $h$ equals the height of the center pin above the rail. This equation may be derived by equating the clockwise moments taken about the point where one wheel is tangent to the track to the counterclockwise moments taken about the same point. Since the force F exerted upon each wheel by the track acts through this point, its lever arm is zero and hence it exerts no moment.

In order to satisfy Equation 2 it is necessary that the vertical forces acting on the truck be in equilibrium. Prior to braking, the axle 48 is, of course, in static equilibrium and this condition can be expressed by the equation:

(5) $W - N = 0$ or $W = N$ where W is the portion of the entire weight of the vehicle which is supported by each wheel and N is the track reaction. If the following relationship can be established, this condition may be maintained during the braking operation:

(6) $W - \Delta W = N - \Delta N$

The forces which act during braking to disturb the static equilibrium of the axle are the turning moment due to the inertia of the car body and the force exerted on the truck frame due to the anchorage of the brake arms 34a. As seen above, the force F exerted by the track on each wheel does not apply a turning moment to the truck about the point of tangency of the wheel and track, hence $\Delta N$ is the change in vertical reaction produced on the axle due to the inertia of the car body. The vertical reaction produced on the axle due to the braking torque $P_P$ can be seen to be $P \sin \phi$, where $\phi$ is the angle which the brake arm 34a makes with the horizontal. Since there are the only two forces which tend to disturb the vertical equilibrium of the axle, it can be seen that Equation 6 can be satisfied if the vertical braking component $P \sin \phi$ can be made to oppose the change in reaction $\Delta N$. It has been found that this can be achieved by arranging the brake at the rear of the truck with its brake arm 34a disposed in a forward direction and at a suitable angle and by arranging the brake at the front of the truck with its brake arm disposed rearwardly and at a suitable angle. Thus, substituting in Equation 6 the expression $P \sin \phi$ for $\Delta W$, it can be seen that the conditions of Equation 2 will be fulfilled if the following relationship can be established:

(7) $\qquad W - P \sin \phi = N - \Delta N$

Rewriting Equations 4 and 7, the following relationship can be seen:

$$\Delta N = \frac{2Fh}{b}$$

$$\Delta N = N - W + P \sin \phi$$
or since $N = W$
$$\Delta N = P \sin \phi$$

Therefore:

(8) $\qquad P \sin \phi = \frac{2Fh}{b}$ or $\sin \phi = \frac{2Fh}{bP}$

If this equation can be fulfilled, no change in spring or journal loading will occur.

Referring to Fig. 5, it can be seen that the resultant braking force P acts upon the wheel and axle assembly at a distance $p$ from the center of the axis and this is balanced by an equal and opposite force P acting on the truck frame at 40. This distance $p$ can be readily calculated in any given brake arrangement.

The torque developed by the friction force at the rail is equal to the braking torque, hence (9) $\qquad Pp = FR$ where R is the wheel radius. In other words:

(10) $\qquad P = \frac{FR}{p}$ substituting this value of P is Equation 8 gives

(11) $\qquad \sin \phi = \frac{2hp}{Rb}$

From a different aspect, consider the reactions on the truck frame. The vertical component at point 40 is $P \sin \phi$ down on the left and up on the right, Fig. 1. The total horizontal force due to the reaction of the brake arm on the truck frame is $2P \cos \phi$, acting forward along the center line connecting the axles. The total horizontal reaction on the pedestals acting rearwardly is $2F + 2P \cos \phi$. Therefore, the resultant horizontal reaction rearwardly along the center line connecting the centers of the two axles is,

(12) $\qquad 2F + 2P \cos \phi - 2P \cos \phi = 2F$

In addition, we have the horizontal force 2F due to the inertia of the car body acting forwardly at the bolster center plate height.

The combination of these horizontal forces gives a couple $2F(h-R)$ tending to rotate the truck frame clockwise.

This is counteracted by the couple $P \sin \phi$ times the horizontal distance between the points of support of the arms 34a, (points 40 front and rear).

The moment arm of the counteracting couple is $$b - \frac{2p}{\sin \phi}$$

Therefore,

(13) $\qquad 2F(h-R) = P \sin \phi \left(b - \frac{2p}{\sin \phi}\right)$

/or $$2F(h-R) = Pb \sin \phi - 2Pp$$

Since $FR = Pp$, therefore, $$2Fh = Pb \sin \phi$$

Hence $$\sin \phi = \frac{2Fh}{Pb}$$

or substituting for P its value $\frac{FR}{p}$, $$\sin \phi = \frac{2hp}{Rb}$$

which agrees with the previous derivation, (see Equation 8).

For the purposes of computation, the following values may be assumed: wheel base $b$, 9 feet; elevation of center plate $h$, 31½ inches; wheel radius R, 17½ inches; and effective brake radius $p$, 11 inches.

Thus, it will be seen that to satisfy the above requirements the brake torque must be applied to the truck frame in the plane of the axles and at a distance $c$ from the adjacent axle, which distance can be readily determined under the assumed conditions, from the equation $$c = \frac{p}{\sin \phi} = \frac{11}{.3665} = 30 \text{ inches}$$

Since the wheel base has an assumed value of 9 feet or 108 inches, the distance between the points 40 at front and rear is 48 inches, and this relation holds whether the brake torque is applied to truck frame by an arm, as 34a extending at an angle to the plane of the axle or by an arm extending in the plane of the axle and supported at one end on the axle and at its opposite end at a point on the truck frame in the plane connecting the axles and located 30 inches from the axle.

Considering the forces acting on the truck frame during braking from another aspect, it will be seen that they can be resolved into a pair of opposing couples of forces acting on the frame in the manner now to be described.

The longitudinally acting resultant force 2F, see Figure 4, due to the frictional forces acting on the wheels at the track rails is equal, and opposite in direction, to the corresponding force 2F acting longitudinally on the frame at the truck center plate height. The resultant force 2F due to the track friction forces acting on the wheels, however, acts on the truck frame through the pedestals in the plane of the axles. Hence, it can readily be seen that the couple produced by these opposing forces acting at different heights and tending to tilt the frame forwardly, may be expressed symbolically by $2F(h-R)$, where $h$ is the height of the center plate above the tracks and R is the wheel radius.

To prevent this tilting, the braking forces are so applied to the truck frame as to produce a second couple of forces substantially equal, but opposite in direction, to the couple $F(h-R)$, this second couple being applied, according to the invention, by the proper location of the brake-supporting connections with respect to the frame. Designating the vertical component of the braking forces acting at each of the connections, as 40, upon the truck frame by T, and the distance between the respective connections, as 40, at the opposite ends of the frame, by $a$, it will be seen that $Ta$ symbolically expresses this second couple.

Therefore, to maintain the exact longitudinal equilibrium of the truck frame during braking, it follows that couple $2F(h-R)$ must equal couple $Ta$.

Since the vertical components of the braking forces acting on the frame at its opposite ends to produce this equilibrium act at the connections, as 40, spaced a distance, as $a$, from each other, it will be seen that the effective length of each brake-supporting means 34a, 35 extending between its associated axle and its connection to the truck frame, and indicated in Figure 5 by the letter $c$, must be such that the connections 40 at opposite ends of the truck are each spaced from the vertical central transverse plane of the truck frame by one-half the distance $a$ separating them.

From the equation $2F(h-R)=Ta$, this distance, $\frac{1}{2}a$, is found to equal $$\frac{F(h-R)}{T}$$

i. e. the effective length of each longitudinally extending brake supporting means, as 34a, 35 between its associated axle and its connections to the frame must be such as to space the connections of the support to the frame from the vertical central transverse plane of the truck by a distance substantially equal to the product of the track friction force acting through said associated axle upon the truck frame multiplied by the distance between the horizontal plane of the center plate and the plane of the axles divided by the vertical component of the torque reaction of said brake-supporting means upon the truck frame through the connections therewith.

Thus by this invention the forces acting on the truck frame during the braking are so applied as to always maintain the truck frame in equilibrium and thereby avoid entirely the condition heretofore present during the braking known as "pitching," which condition was particularly marked where soft springs were used between the truck frame and the axles. Soft springs are desirable for easy riding qualities and with this invention, they can be used without causing "pitching" of the truck frame when the brakes are applied.

While we have shown a preferred form of embodiment of our invention, we are aware that modifications may be made thereto and we therefore desire a broad interpretation of the invention within the scope and spirit of the disclosure herein and of the claims appended hereinafter.

What we claim is:

1. In a railway truck having a frame, a plurality of longitudinally spaced supporting wheels, similarly spaced means to resiliently support said frame from said wheels, a brake disc rotatable with each said wheels, a brake shoe movable into contact therewith, a support for said brake shoe, said support being attached to the frame at an angle to the horizontal plane of the wheel axles such that the change of loading on the resilient supporting means at opposite ends of the truck frame due to the braking is balanced by vertical components of the braking torque.

2. A railway truck having a plurality of axles, a frame, flexible supports between the frame and axles, wheels for said axles and brakes for said wheels, said brakes being anchored to the truck frame so that the brake torque does not substantially vary the vertical load on the flexible supports, the anchoring means comprehending a torque arm anchored to the truck frame in the horizontal plane of the wheel centers intermediate an associated wheel and the center of the frame, and making a relatively acute angle with the said plane.

3. In a railway truck frame, longitudinally spaced wheel and axle assemblies, resilient means interposed between the wheel and axle assemblies and the frame, a center plate, disc brakes for the wheels having segmental shoes, anchor arms for the shoes in line with the center of resultant brake shoe drag at substantially right angles to the axial plane of symmetry of the segmental shoes, and connections between the anchor arms and the truck frames lying substantially in the horizontal plane of the wheel axles, the parts being so constructed and arranged that the sine of the acute angle between the anchor arms and the horizontal plane of the wheel axis is equal to twice the product of the heighth of the center plate above the track and the distance from the wheel axis to the center of the resultant drag divided by the product of the radius of the wheel tread and the length of the wheel base.

4. A railway truck having a frame including a central transverse member provided with a center plate for supporting a car body from said frame, fore and aft wheeled axles supporting said frame through resilient means interposed between said axles and frame, respectively, said center plate being at a higher level than the plane of said axles, brakes associated with each of said wheeled axles and including rotary and non-rotary members cooperating to effect the braking and actuating means therefor, separate supporting means for the non-rotary members at the opposite ends of the truck, each said supporting means extending generally longitudinally of the truck and being carried at one end by one of said axles and at its other end through connections to the truck frame arranged in a vertical transverse plane between the vertical plane of the associated axle and the central vertical transverse plane of the truck, the distance between an axle and the connections of the associated brake supporting means to the frame being substantially less than the distance between the connections to the frame of the brake-supporting means at the opposite ends of the truck, and said connections being so located that the torque reactions transmitted to the frame through them produce a couple tending to rotate the frame about a transverse axis, which couple is substantially equal, but opposite in direction, to the couple tending to rotate the frame about said transverse axis and produced by the momentum of the car body and the frictional force acting on the wheels at the track rails, whereby the tendency of the truck frame to tilt in braking is substantially eliminated.

5. A railway truck having a frame including a central transverse member provided with a center plate for supporting a car body from said frame, fore and aft wheeled axles supporting said frame through resilient means interposed between said axles and frame, respectively, said center plate being at a higher level than the plane of said axles, brakes associated with each of said wheeled axles and including rotary and non-rotary members cooperating to effect the braking and actuating means therefor, separate supporting means for the non-rotary members at the opposite ends of the truck, each said supporting means extending generally longitudinally of the truck from an axle inwardly toward the center of the truck and being carried at one end by its associated axle and at its other end by connections to the truck frame through which braking torque is transmitted to said frame, the connections of said supporting means at the opposite ends of the truck being so disposed substantially in the plane of the axles and with respect to their distances from their respective associated axles and from each other that the turning moment acting on the truck frame, tending to rotate it about a transverse axis and due to the braking torque acting through said connections, is substantially equal, but opposite in direction, to the turning moment acting on the frame to rotate it about said axis and produced by the combined effect of the momentum of the car body and the frictional force acting on the wheels at the track rails, whereby the tendency of the truck frame to tilt in braking is substantially eliminated.

6. A railway truck having a frame including a central transverse member provided with a center plate for supporting a car body from said frame, fore and aft wheeled axles supporting said frame through resilient means interposed between said axles and frame, respectively, said center plate being at a higher level than the plane of said axles, brakes associated with each of said wheeled axles and including rotary and non-rotary members cooperating to effect the braking and actuating means therefor, separate supporting means for the non-rotary members at the opposite ends of the truck, each said supporting means extending generally longitudinally of the truck from an axle inwardly toward the center of the truck and being carried at one end by its associated axle and at its other end by connections to the truck through which braking torque reactions are transmitted to said frame, said connections being located for each supporting means between one of said axles and the transverse vertical central plane of the truck so that the effective length of each supporting means between its associated axle and its torque reaction connections to the frame is such as to space said connections from said transverse vertical central plane of the truck by a distance substantially equal to the product of the track friction force acting through the associated axle upon the truck frame multiplied by the distance between the horizontal plane of the center plate and the plane of the axles divided by the vertical component of the torque reaction of said brake-supporting means, respectively, acting upon the truck frame through their respective connections therewith, whereby the tendency of the truck frame to tilt in braking is substantially eliminated.

RUPEN EKSERGIAN.
CAROLUS L. EKSERGIAN.